March 9, 1965 R. E. GEE ETAL 3,172,736
APPARATUS FOR CONTACTING A GAS WITH A LIQUID
Filed Dec. 30, 1960
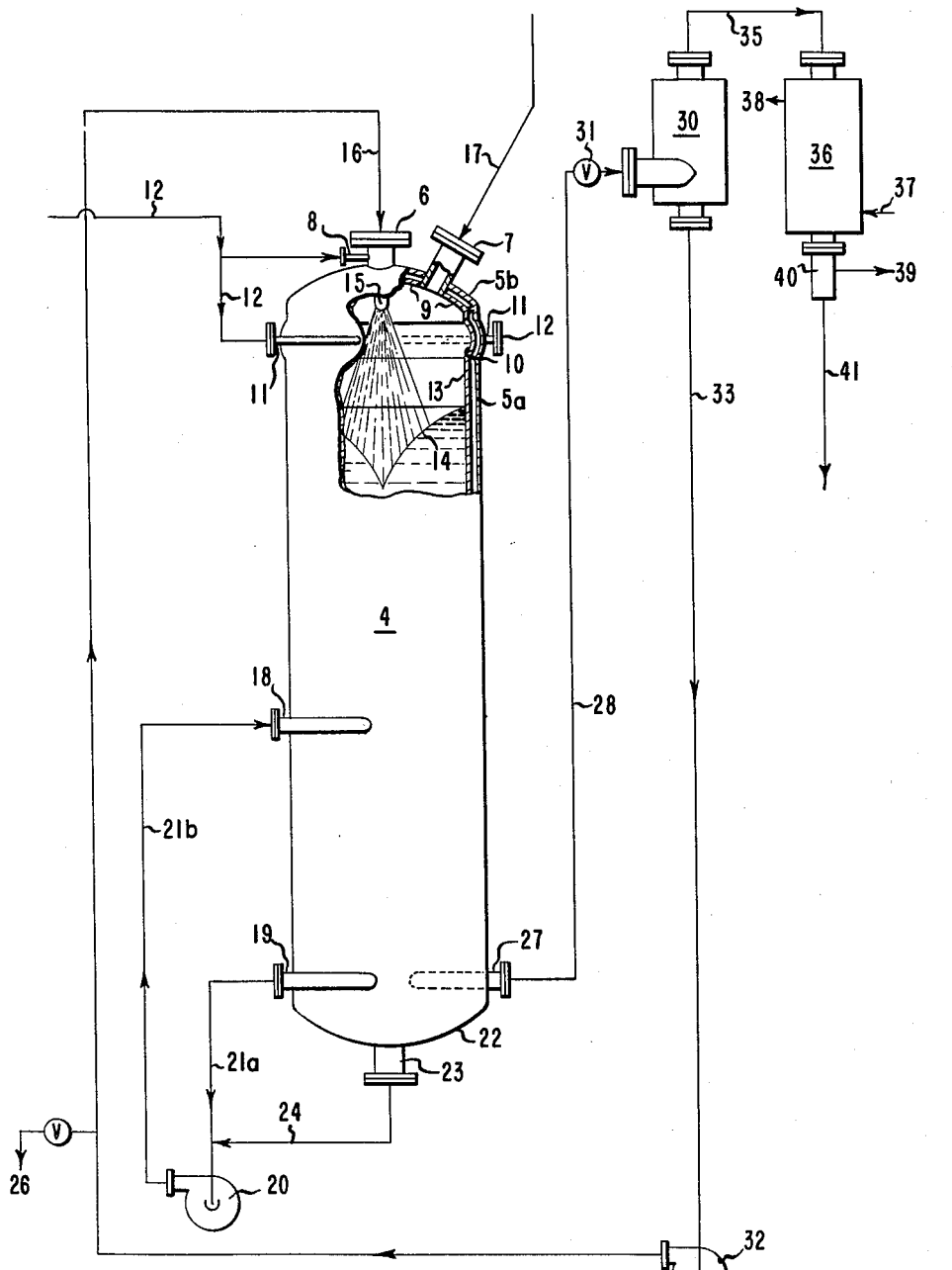
INVENTORS
ROBERT EARL GEE
JOSEPH BURNHAM GRAY
PAUL RAYMOND HIPPELY
HAROLD ANTHONY O'HERN, JR.
JOHN BROCKWAY THOMPSON
BY
ATTORNEY

United States Patent Office 3,172,736
Patented Mar. 9, 1965

3,172,736
APPARATUS FOR CONTACTING A GAS
WITH A LIQUID
Robert Earl Gee, Chadds Ford, Pa., Joseph Burnham
Gray and Paul Raymond Hippely, Wilmington, Del.,
Harold Anthony O'Hern, Jr., Charlottesville, Va., and
John Brockway Thompson, Wilmington, Del., assignors
to E. I. du Pont de Nemours and Company, Wilmington, Del., a corporation of Delaware
Filed Dec. 30, 1960, Ser. No. 79,593
4 Claims.  (Cl. 23—285)

This invention relates to an apparatus for the reaction of a gas in a liquid to form a solid product wherein such gas exhibits a low solubility in the liquid, and more particularly, to an apparatus in which a gas is polymerized to a solid and the solid tends to adhere to the internal surface of the reactor as it is produced.

The majority of reactors for use in gas-liquid contacting operations involve some type of mechanical agitation of the liquid to increase the interfacial area of contact between the gas and the liquid, which, in turn, increases the rate of reaction that is normally limited by the rate of solution of the gas in that liquid. In cases where the products of the reaction are gases, liquids, or non-sticky solids, the presence of moving mechanical agitators within the reaction zone is usually not detrimental to the operation of a reactor. Such mechanical agitators may include propeller blades, rotating agitators, and turbine agitators, any of which may be especially designed for drawing gas into the reactor and intensively mixing it with the liquid. Such mechanical agitation is especially effective when the gas exhibits a low solubility in the liquid. Usually baffles are provided in vessels having centrally located agitators to prevent axial rotation of the entire contents of the vessel and to provide efficient and intimate mixing of the contents.

When a gaseous monomer employed in a given polymerization system exhibits a tendency to polymerize upon contact with any solid surface, such as the mechanical agitator set forth above, the operability of the mechanically agitated device is greatly reduced due to the tendency of the solid to build up on the moving parts of the agitator. In many cases, this solid build-up is sufficiently great to render conventional mechanically agitated vessels impractical for this type of reaction. In the process set forth hereinbelow the solids which are produced exclusively within the reaction medium are neither sticky nor adhesive, but the solids which are formed when the gaseous monomer polymerizes upon a surface within the reactor tend to adhere to the surface. The polymer produced by this surface effect will hereinafter be termed "adhesion polymer" and should be distinguished from the polymer formed exclusively within the liquid medium which does not by itself adhere to the internal surfaces of the reactor. This surface effect precludes the use of an instantaneous mixing device which would contact the gas and liquid in a confined zone, such as the common types of jet-mixers, since the polymer tends to foul these restricted areas, thereby plugging the mixing device. An apparatus which would provide sufficient volume to complete the polymerization reaction, and at the same time, eliminate the need for internal mechanical agitation to effect solution of the gas, will fulfill a widespread need for use with reactions which produce an adhesion polymer.

Accordingly, it is an object of the present invention to provide an apparatus for the continuous reaction of a gaseous monomer and a liquid wherein the gas exhibits a propensity to polymerize upon the internal surfaces of the reactor during polymerization, thereby forming adhesion polymer. Another object of the present invention is to provide an apparatus exhibiting a minimum amount of internal reactor surface which is exposed to the monomer during the polymerization thereof. Still another object of this invention is to provide a means for protecting the internal surfaces of the reaction vessel from contact with the monomer during the operation of the apparatus, and further, to provide a means for continuously removing adhesion polymer which may form on the internal surfaces of the reactor. A further object of this invention is to provide an apparatus which will effectively dissolve in a liquid a gas which has a low solubility in the liquid, without the need of internal mechanical agitation within the dissolving region of the vessel. Still a further object of the present invention is to provide a reactor which will effectively dissolve a gas in a liquid, and provide a gradient of decreasing concentration of the gas through the reaction zone.

The above objects are accomplished by providing an apparatus for the reaction of a gas in a liquid with the formation and removal of the reaction product of the gas which comprises a vessel which is vertically positioned on its long axis and has a circular cross section on a horizontal plane. The vessel is provided with a means, such as a pump and associated piping, which is operative to circulate the contents of the vessel about its vertical or long axis, with the contents substantially confined to the lower portion of the vessel. A plurality of inlet and exit ports is provided for the introduction of unreacted gas and liquid, and for the removal of the reaction product of the gas. The upper portion of the vessel is substantially free of the circulating contents and has one or more inlets for the gas therein and a spray or jet located near the inlets for the gas which is arranged to discharge a predominately liquid stream towards the circulating contents and designed to permit the discharge to strike the contents of the vessel, but not the exposed walls of the vessel. A substantial portion of the inner walls of the upper portion is provided with a means to supply a moving film of liquid, which is usually the same liquid as that which comprises the reaction medium, is non-reactive with the gas, and does not initiate reaction of the gas. A suitable means may be provided for heat-exchange into or away from the reaction medium depending upon whether the reaction is endothermic or exothermic.

A particularly desirable apparatus of the present invention for reacting a gas in or with a liquid comprises the following features and comprises a vessel having a top, a bottom, and walls joining the top and bottom to form a substantially cylindrical closure. Preferably, this closure or vessel, has its long axis positioned vertically and has an upper and a lower portion. At least one inlet port is provided in the upper portion for introduction of the gas along with a device, such as a spray nozzle, which is designed to emit a predominately liquid stream of conical configuration. This spray device is positioned to discharge towards the lower portion of the vessel and serves to entrain the gas introduced into the upper section. The upper section is also provided with at least one inlet for liquid which is positioned tangentially to the walls of the upper portion near the top. The lower portion of the vessel has an upper and a lower port each of which is positioned tangentially to the walls of the lower portion. A means, such as a pump and associated piping, is provided to withdraw material from the interior of the vessel through the lower port and to inject this material into the vessel through the upper port to impart a swirling motion to the material in the vessel. Other means, located in the lower portions of the second section may also be provided to impart a swirling motion to the material within the vessel, e.g. an impeller. At least one other port is provided in the lower portion of the vessel to withdraw a part of the contents for recovery of the reaction product and/or to control the temperature of the contents by either heating or cooling the stream and returning it to the reactor.

A more complete understanding of the apparatus of the present invention may be had by referring to the drawing attached hereto and made a part of this specification in which FIGURE 1 is a schematic view of the reaction vessel with a partial cross section and associated circulation and cooling devices. For purposes of illustration, the reactor is shown as a vertically mounted cylindrical vessel 4 surrounded by jackets 5a and 5b. With some reaction systems it is desirable to heat or cool jacket 5b exclusively to prevent polymer build-up over the top of the reactor, but it may also be desirable to adjust the temperature of the walls of the vessel by supplying a suitable fluid for heat exchange to jacket 5a. The top is constructed in the form of a dished head but may be a flat plate. Two main inlets 6 and 7 and a smaller tangentially located inlet 8 are provided in the head of the vessel. An internal annular groove 10 with one or more tangentially positioned inlets 11 is also located in the head of the vessel. Usually, the same liquid as that which comprises the reaction medium, but without catalyst, is introduced to inlets 11 through lines 12 causing a rotating ring of liquid to form in the groove 10 and to flow down the internal wall 13 of the reactor 4 in the form of a rotating, down-flowing film. The liquid in stream 12 which is injected through inlets 11 is also supplied to the smaller tangential inlet 8 located on the major inlet 6. This arrangement permits the internal surface of inlet 6 and the spray nozzle 15 to be continuously bathed in liquid while inlets 11 serve to bathe upper cylindrical wall 13 above the surface of the liquid reaction medium. A suitable heat transfer fluid may be supplied to jacket 5b to maintain the unbathed head 9 of the reactor at a temperature which inhibits formation of adhesion polymer in that area. A circulating system which is described hereinbelow causes the contents of the vessel to form a forced vortex such as indicated in the cutaway portion at 14. A nozzle 15 is positioned within inlet 6 and is designed to emit a spray of conical configuration with the conical portion having a narrow apex angle, usually in the range of 25 to 50°. The angle of the spray is designed so that the liquid solid mixture emitted therefrom will strike the surface of the swirling reaction medium exclusively, and not the reactor wall 13. Sufficient material should be supplied through line 16 to permit the nozzle 15 to deliver a spray upon the surface of the contents of the vessel at a velocity of from 25 to 70 feet/second and preferably above 45 feet/second for the purposes of entraining a gas which is fed through the inlet port 7 via line 17.

Approximately ⅔ of the way down the reactor wall is another tangential inlet 18 which is connected to tangential outlet 19 (located near the bottom of the wall) via pump 20 and lines 21a and 21b. These inlet and outlet ports are somewhat larger than inlets 11, since they are designed to handle a relatively large amount of material. By continuously withdrawing reaction mixture through outlet 19 and recirculating it into inlet 18 a swirling motion is imparted to the contents of the reactor. The configuration of the base of the reactor is not critical and may be in the form of a cone or a dished head 22 as shown. The dished head is preferred since the circulating system previously described will also maintain a swirling action at the very base of the reactor. An additional outlet 23 and line 24 may be provided in the base of the reactor for cleaning or for modification of the circulating pattern induced by the external loop connecting openings 18 and 19. A tangential draw-off via port 19 is utilized to permit high swirl rates within the reactor by producing a forced vortex which is not excessively deep as would be the case if the liquid were drawn off solely through outlet 23. The tangential draw-off 27, which forms a portion of the evaporative cooling system described hereinbelow, is arranged to draw off liquid tangentially, but in a direction opposite to that of the swirling liquid as does outlet 19. The circulating system, consisting of inlet port 18, outlet port 19, line 21a, line 21b, and pump 20, induces the previously mentioned swirling of liquid within the reactor. The introduction of slurry through port 18 tends to maintain a zone of liquid and solid containing a low concentration of monomer adjacent to the walls of the vessel and reduces the polymerization of monomer on the walls with the subsequent reduction in the formation of undesirable adhesion polymer thereupon. The centrifugal action of the swirling liquid increases the solid concentration at the outside walls thereby providing a slurry of high solids concentration which will abrade the walls of the vessel and in so doing remove any adhesion polymer which is formed thereupon during the continued operation of the reactor. This abrasive action is extremely important for continued operation of the vessel and the contents of the vessel should revolve with an average wall velocity of at least 6 feet per second and preferably at least 10-12 feet/second. An important feature of this invention is that there is a definite vertical gradient with respect to the free monomer within the reactor. Thus, the monomer in the reaction mixture is substantially polymerized near the base of the reactor and the material or slurry, which is withdrawn through outlets 19 or 27 and into line 21a in the case of outlet 19 and thence through pump 20 and line 21b to inlet port 18, will exhibit a minimum tendency to form adhesion polymer on the interior walls of the pump and transfer lines. It should be noted that the outlet ports are arranged to withdraw the contents of the vessel in the direction opposite to that of the swirl imparted by the circulating system. This reverse tangential arrangement helps to prevent the plugging of the withdrawal lines by any large solids which may be present in the reactor.

The contents of the reactor are cooled by the external evaporative system consisting of flash chamber 30 and condenser 36. A stream is drawn from outlet 27 through line 28 to flash chamber 30 through letdown valve 31. The contents of the reactor are maintained at substantially atmospheric pressure and, since the flash chamber 30 is maintained at a pressure in the range of from 50 to 400 millimeters of mercury absolute, no external pumping means is necessary to draw the stream into the flash chamber 30. When using the materials described in the example hereinbelow at the pressure range of 50 to 400 millimeters of mercury absolute, approximately 3% to 10% of the fluid is vaporized and the temperature of stream 33 which is returned to the reactor through pump 32 is decreased from 5°-20° C. Under normal conditions, the sole means of heat removal is realized by this vaporization of the draw-off stream. The vapors passing from the flash chamber 30 via line 35 are thereafter condensed in a chilled water condenser 36 to which a coolant at a suitable temperature is supplied via line 37 and withdrawn via line 38. The uncondensed materials passing from condenser 36 may thereafter be routed to additional condensers or scrubbers for the recovery of the materials therein and the stream is finally passed to a system of barometric ejectors (not shown on this drawing) to maintain the above-mentioned vacuum within the flash chamber 30. A disengaging section 40 attached to condenser 36 is advantageously employed to separate the liquid stream 41 from the vapor stream 39. The liquid stream may be sent to suitable recovery sources (not shown herein) or may be recycled directed to the reactor 4 via line 33 to act as part of the stream sent to the spray nozzle 15. Since the off gas system consisting of the flash chamber 30 and condenser 36 is operated at subatmospheric pressure, suitable barometric legs (not shown in this diagram) are provided.

A typical example of the operation of the present reactor to polymerize formaldehyde to a high molecular weight polymer is given in the following paragraph.

A reactor 12 inches in diameter and 72 inches in height of substantially the same configuration as that shown in FIGURE 1 was used to polymerize formaldehyde gas to a solid polymer. The circulation system was sized to permit a regulated flow rate of from 25 to 100 gallons of liquid/minute. Prior to the introduction of gaseous formaldehyde through port 7 via line 17 the reactor was filled approximately ¾ full with cyclohexane. Any organic liquid substantially inert to formaldehyde, having a melting point above 0° C. and a boiling point in the range of from 60 to 95° C. at atmospheric pressure is operable. The circulating loop, comprising line 21a, pump 20, and line 21b, the cooling loop, comprising lines 28 and 33 and the jet-spray loop exit pump 32, via line 16, were also filled with the liquid. The same liquid was employed throughout the operation to bathe the upper portion of the reactor walls and was introduced through inlets 11 and 8 via line 12. The swirling motion was started by activating pump 20 and in this example the flow-rate through lines 21a and 21b was adjusted to approximately 50 gallons/minute resulting in an inlet velocity through nozzle 18 of approximately 52 feet/second with a resultant liquid velocity at the internal wall of the vessel of about 12 feet/second. When the swirl velocity reached 12 feet/second, the required additional liquid was added through the upper inlet ports 11 and 8 at a pressure of about 20 to 30 pounds/square inch, the flow rate at inlet 8 being about 1 gallon/minute and the flow rate at inlets 11 being about 2 gallons/minute. A suitable polymerization initiator was introduced into line 16 upstream of pump 32 at a rate of about 0.01 pound/hour, and formaldehyde gas was introduced via line 17 through port 7 at a rate of from 62 to 76 pounds/hour. The pressure in the flash chamber was reduced sufficiently to set the boiling point of the liquid therein at 30° C. The spray rate was controlled at about 20 gallons/minute to maintain a monomer pressure in the free space of the reactor of about 1 p.s.i.g. In this example, the condensate from condenser 36 was also added to line 33 via line 41 for return to the reactor. The rate of slurry draw-off via line 26, for further recovery of the solid product was controlled to maintain a constant level of slurry in the reactor. The concentration of free monomer at the base of the reactor was practically nil, and therefore, the circulating loop and the evaporative cooling system, through which slurry was withdrawn from the base of the reactor, were substantially free of adhesion polymer. Under these conditions, the reactor was operated for approximately 25 hours whereupon the liquid was drained from the apparatus, and the apparatus was dismantled. Visual inspection of the apparatus indicated that there was no excessive formation of adhesion polymer in the equipment. Substantially continuous operation of this apparatus is possible in the polymerization of formaldehyde according to the general procedures described above.

The apparatus of this invention produces a forced vortex, and for that reason, the swirl velocities within the reactor may be maintained at a high rate without realizing an excessively deep vortex within the reactor. One may determine by experimentation the optimum vortex for a particular operation. In a system for the polymerization of formaldehyde gas to solid formaldehyde polymer it has been determined that the minimum wall velocity for optimum operation is about 6 feet/second. At lower velocities adhesion polymer forms upon the internal walls of the vessel. The depth of the vortex may be expressed by the following equation:

$$H_v = \frac{V^2}{2g_c}$$

wherein $H_v$ is the depth of the vortex in feet, V is the wall velocity of the swirling liquid in ft./second and $g_c$ is a conversion factor (32.2 feet/second²). It becomes apparent from the above equation that the maximum wall velocity will be dictated by the physical considerations of the equipment, i.e., as the depth of the vortex increases the hold-up volume within the reactor decreases, necessitating larger and larger equipment to maintain an acceptable hold-up time. Thus, the physical consideration of equipment size will in turn govern the maximum rate of swirl which is utilized in a given reactor.

The concentration of monomer at the internal walls of the reactor is held at a minimum by virtue of the introduction of slurry having a low monomer concentration through inlet 19. It is believed that the slurry entering the reactor via port 18 provides a film of slurry at the walls of the reactor which is low in free monomer and helps to retard the formation of adhesion polymer upon those internal surfaces.

In addition to the control of the polymerization by the physical adjustments set forth above, it should be noted that the polymerization catalyst as above-described may be introduced into practically any of the inlet ports of the present reactor to further adjust or control the rate of polymerization. The preferred point of injection is in line 33 upstream of pump 32 since there is virtually no free monomer in that line and the introduction of polymerization initiator at that point will cause no polymer formation within the pump or the transfer line 16 to the nozzle 15.

As pointed out above, a substantial portion of the monomer present in the stream passing to the flash chamber 30 will be removed by the degassing action thereof and may be recovered in subsequent condensation and/or scrubbing apparatus. Thus, the cool liquid leaving the flash chamber 30 via line 33 will exhibit little tendency to plug the restricted areas of the pump and transfer lines even when the polymerization and initiator is injected therein, which permits spray nozzle 15 to be operated for extended periods of time. The monomer entering inlet port 7 is rapidly absorbed in the spray emanating from nozzle 15 and by the time the mixture reaches the zone of exit nozzles 19 and 27, the polymerization reaction is substantially complete since the flow is substantially that of a rotating plug within the reactor.

Outlet nozzles 19 and 27 are preferably arranged to remove their respective streams in a direction opposite to the main swirl within the reactor thereby minimizing the plugging of these outlets during periods of continued polymerization wherein particles of solid matter may be dislodged from the walls of the reactor by the abrasive action of the swirling slurry.

In the polymerization process of the example, it is impractical to employ conventional heat exchangers to remove the heat of polymerization, since a very thin film of adhesion polymer tends to form in the tube and will adversely affect the heat transfer rate of an exchanger, although this rather thin film does not adversely affect the mechanical operation of the transfer lines both for the circulating loop and for the evaporative cooling system.

The apparatus of this invention provides an extremely effective means for contacting a gas with a liquid by providing a large interfacial area between the gas and the liquid thereby obtaining substantially equilibrium conditions in the reactor and permitting predictable scale-up to a larger reactor, using the equilibrium conditions and the relative flow rates. This type of scale-up is difficult with conventional, mechanically agitated vessels since the action of the gas and the liquid is not nearly as predictable as it is in the apparatus of the present invention. The evaporative cooling system and the recirculating loop are easily controlled to obtain a wide range of polymerization rates and a wide range of solids concentration in the exit slurry. These reliable means of control, as opposed to the less reliable methods previously required in apparatus of this nature, allow the present apparatus to find widespread commercial use in the reaction of gases in, or with liquids, with the continuous formation and removal of solid products. Additional inlet and exit nozzles, as well as internal baffles, may be employed to direct the flow of the contents within the vessel without departing from the spirit of the invention, as long as such additions do not expose the internal surfaces of the reactor to monomer gas or to liquid having a high monomer concentration. One skilled in the art will readily appreciate that the apparatus of the present invention may be used for the copolymerization of formaldheyde with other monomers, as well as the production of polyoxymethylene by the polymeriztion or copolymerization of other oxymethylene producing monomers, for example, trioxane.

In the preferred embodiment just described, the sole means of securing circulation of the reactor contents in the swirling motion was by means of the external pump. As a less desirable alternative which may be used in situations where adhesion polymer is less likely to build up, an internal agitator may be arranged in the bottom of the reactor, below the level where dissolved or gaseous monomer exists, with the blades so designed and oriented that they will impel the swirl motion to the reactor contents in much the same manner as the external circulatory system. In most cases, the advantages of conventional pumps and piping will frequently outweigh the advantages of the unitary agitator, because the latter brings with it the problems of stuffing boxes in the reactor wall and speed reducers, etc.

We have described a distributor (item 10 of FIGURE 1) as a means of providing the liquid for the washed wall in the upper part of the reactor. This arrangement can handle recycled liquor containing suspended particles of polymer, without plugging of parts. If a clean liquid or a filtered recycle fluid is available, an alternative means of providing the washed wall would comprise feeding that liquid through a porous section in the upper part of the reactor, either in place of the annulus 10, or for the entire portion of the reactor wall above the liquid gas-vertical interface.

We claim:

1. An apparatus for the reaction of a gas in a liquid which apparatus comprises a top, a bottom, and walls joining the top and the bottom to form a substantially cylindrical vessel having its long axis positioned vertically, said vessel having an upper portion and a lower portion, said upper portion having at least one gas inlet port, a device for emitting a predominately liquid stream in a conical configuration arranged to discharge towards said lower portion, and at least one liquid inlet port positioned tangentially to the walls of said upper portion and located near the said top; said lower portion having an upper port and a lower port, each positioned tangentially to the wall of said lower portion, a means operative to withdraw material from the interior of said vessel through said lower port and inject said withdrawn material into said vessel through said upper port, and an outlet port to withdraw a portion of the contents of said vessel.

2. An apparatus for the reaction of a gas in a swirling pool of liquid, which comprises a vessel having a first section of substantially circular cross section, a second section, a means operative to swirl the contents in said first section of said vessel about an axis perpendicular to said cross section, sufficient passageways for the introduction of gas and liquid and for the withdrawal of the reaction product of said gas; said second section of said vessel being substantially free of said circulating contents and provided with at least one gas inlet, a means for supplying a continuously replenished film of liquid to cover substantially the entire surfaces of said second section, and a spray device positioned in said second section to discharge a predominately fluid stream towards said swirling pool of liquid with said stream contacting said circulating contents exclusively.

3. An apparatus for the reaction of a gas in a liquid reaction medium and the recovery of the reaction product of said gas which comprises a substantially cylindrical vessel having its long axis positioned vertically and being of substantially circular cross section as taken in a plane perpendicular to said axis, said vessel having an upper portion and a lower portion, a means operative to circulate the contents of said vessel in a circular path about the long axis of the said vessel and exclusively in said lower portion, a means for the withdrawal of a portion of the contents of said vessel and recovering said reaction product from the withdrawn portion; said upper portion being substantially free of said circulating contents and having at least one gas inlet port, a spray device located in close proximity to said gas inlet port and arranged to discharge a predominantly liquid stream towards said circulating contents with said stream contacting said contents exclusively, and a plurality of liquid inlet ports, each positioned in the same direction, tangential to the walls of said vessel, so as to provide a swirling film of inert liquid over substantially all of the interior walls of said upper portion; said means operative to circulate the liquid reaction medium in said vessel consisting essentially of an upper and a lower opening located in the lower portion of said vessel and positioned tangentially to the wall thereof with a means for withdrawing said contents from the lower opening located near the bottom of the vessel and injecting the withdrawn contents into the upper opening thereby inducing a swirling movement to the contents of said vessel.

4. An apparatus for the continuous, exothermic polymerization of a gas in a liquid containing a polymerization catalyst, and for the recovery of a polymer, which appartus comprises a cylindrical vessel having its long axis positioned vertically and having an upper portion and a lower portion, a means operative to circulate the liquid contents of said vessel in a circular path about said axis, a plurality of inlet ports for said gas and said liquid, a means for cooling the contents of said vessel, and a means for recovering said polymer, said upper portion being substantially free of said circulating contents and having at least one gas inlet, having a spray device for emitting a predominantly liquid stream of conical configuration towards said circulating contents with said stream contacting said contents exclusively, and having a plurality of inlets for the injection of a catalyst-free liquid, each inlet being positioned so as to discharge liquid tangentially to the walls of said vessel so as to cover substantially all of the interior wall surfaces of said upper portion with a continuously replenished, swirling film of said catalyst-free liquid; said means to induce axial circulation of said contents consisting essentially of an upper and a lower opening each located in the lower portion of said vessel and positioned tangentially to the wall thereof with a means for withdrawing said contents from the lower opening located near the bottom of the vessel and injecting the liquid thus withdrawn through said upper opening into the vessel so as to induce a swirling movement to the contents of said vessel; said cooling means consisting of at least one opening in said lower portion for withdrawing a portion of said circulating contents, a means to advance that portion of said contents to a chamber maintained at a lower pressure than the contents of said vessel thereby vaporizing a portion thereof and a means to recover the polymer from a portion of said unvaporized portion and a means to return the remainder to said vessel through said spray device.

References Cited in the file of this patent
UNITED STATES PATENTS

| | | |
|---|---|---|
| 2,055,836 | Cowles | Sept. 29, 1936 |
| 2,057,100 | Jespersen | Oct. 13, 1936 |
| 2,332,527 | Pyzel | Oct. 26, 1943 |
| 2,533,058 | Shaffer et al. | Dec. 5, 1950 |